March 28, 1944.  E. F. ABER  2,344,956
METHOD OF MANUFACTURING MILLING CUTTERS
Original Filed May 30, 1942

INVENTOR.
Ernest F. Aber
BY Morsell & Morsell
ATTORNEYS.

Patented Mar. 28, 1944

2,344,956

UNITED STATES PATENT OFFICE 2,344,956

METHOD OF MANUFACTURING MILLING CUTTERS

Earnest F. Aber, Waterford, Wis.

Original application May 30, 1942, Serial No. 445,172. Divided and this application February 20, 1943, Serial No. 476,550

2 Claims. (Cl. 90—11)

This invention relates to improvements in Method of manufacturing milling cutters and is a division of application Serial No. 445,172, filed May 30, 1942.

Heretofore circular milling cutters for certain types of work have been formed with teeth having straight cutting edges extending at alternate right- and left-hand angles transversely of the periphery of the cutter. These cutters are expensive to make because the teeth must be cut therein by feeding a cutting tool transversely of the blank from one side to the other, and even when six blanks are cut at one setting, as is common practice, the time element is substantial. For example, if six blanks each one inch thick are to have teeth cut therein, and are placed side by side, then for each tooth the cutting tool must be fed six inches plus approximately one inch for entrance and one inch for withdrawal movement, of a total of approximately eight inches for each tooth. If the cutters being made are to have twenty-four teeth, then the total feed movement to produce six cutters is twenty-four times eight, or one hundred ninety-two inches.

It is an object of the present invention to provide a method of manufacturing a milling cutter of the class described wherein the cutting edges of the teeth are arcs instead of straight and wherein said arcs alternate in general angular direction just as the usual straight cutting edges heretofore referred to angle first toward the left and then toward the right. By utilizing the arcuate shape for the cutting edges of the teeth a shear cut can be obtained when the finished cutter is used. In addition an arcuate cutting edge is longer for the same thickness of blank and the corners of the teeth are not subjected to the same breaking strains to which the corners of straight edged teeth are subjected.

In addition to the structural advantages it is found that by utilizing the arcuate teeth of the present invention cutters can be manufactured with a saving of approximately 90% of time, as will hereinafter be pointed out in detail, and it is therefore an object of the invention to provide a new method of manufacturing cutters involving the use of the arcuate cut to expeditiously produce teeth of the type which alternate in general direction of angularity transversely of the periphery of the blank.

A more specific object of the invention is to provide a method of manufacturing milling cutters of the class described comprising feeding a rotating hollow mill type of cutter into the periphery of the blank with the cutter so supported that its center of rotation is adjacent one side of the blank, and cutting alternate teeth by supporting the rotating cutter with its center of rotation adjacent the opposite side of the blank.

A further specific object of the invention is to provide an improved method of manufacturing cutters of the class described by means of which two cutters may be formed simultaneously. This method comprises placing the sides of two blanks together, feeding a rotating hollow mill type of cutter into the blank with the hollow mill so supported that its center of rotation lies in the plane of the juxtaposed sides of the blank, indexing the blanks and cutting every other tooth, and then shifting the blanks to place the other two sides in contact and repeating the operation to cut the alternate teeth.

With the above and other objects in view, the invention consists of the improved method of manufacturing milling cutters, and all its parts and combinations as set forth in the claims, and all equivalents thereof.

In the accompanying drawing illustrating one complete embodiment of the preferred form of the invention, Fig. 1 illustrates a side view of a blank showing the last tooth being cut therein, the cutting tool being shown in vertical section and the supporting shaft for the blank being shown in cross-section;

Figure 4:
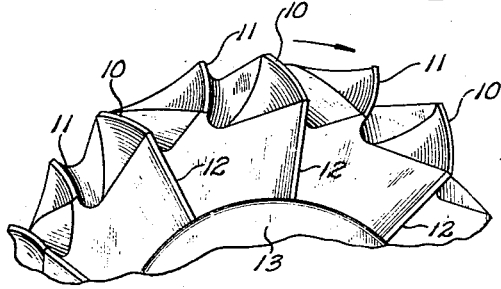
Fig. 4 is a fragmentary perspective view of a finished milling cutter.

Referring more particularly to the drawing, the improved cutter is formed of any suitable metal or alloy and comprises a circular blank 8 having a center opening 9 and having peripheral cutting teeth which have cutting edges 10, which have a general angle extending to the left (referring to Fig. 4) and alternate teeth having cutting edges 11 which have a general angular direction toward the right (referring to Fig. 4). The cutting edges 10 and 11 instead of being straight are in the form of arcs, as illustrated.

In addition, the cutting edges 10 meet with side cutting edges 12 on one side of the blank and the cutting edges 11 meet with similar side cutting edges on the opposite side of the blank. Referring to Fig. 4, the material on the side tapers inwardly as at 13 so that the thickness is reduced in front of the next side cutting edge 12. Thus there are side channels through which a cutting compound can flow during use. In addition the side cutting edges which extend in a generally radial direction provide for cutting at right angles to the axis of the cutter 8, when the latter is used, in addition to the cuts produced by the cutting edges 10 and 11. Due to the fact that one tooth projects toward one side and the next tooth toward the opposite side, this type of cutter is generally called a staggered tooth side milling cutter. Also because of the angular directions of extent of the cutting edges 10 and 11, this type of cutter is generally referred to as a spiral mill. However, on all spiral mills heretofore manufactured the cutting edges 10 and 11 have been straight lines and not arcs.

The peripheral cutting edges 10, which constitutes every other cutting edge, are the arc of a circle whose center 14 is positioned toward one side of the blank, and the alternate cutting edges 11 are the arcs of circles whose centers 15 are positioned toward the opposite side of the blank. In the preferred form of the invention illustrated, the centers 14 actually lie in the plane of one side of the blank and the centers 15 lie in the plane of the opposite side of the blank.

In addition, in the preferred embodiment of the invention the cutting edges 10 are equal to one-half of an arc (comprising two of the arcs 10 as in Fig. 2), whose chord 16 is bisected by the plane of one side of the blank, it being obvious that the chord 16 is bisected by the line 17.

Figures 2, 3:
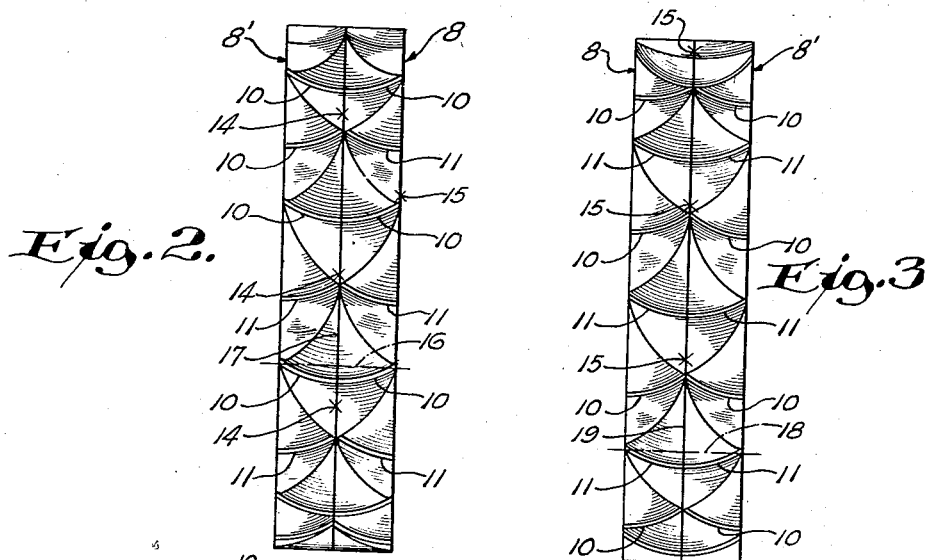
Fig. 2 is a peripheral view showing two cutters placed side by side to illustrate the method of cutting teeth therein.
Fig. 3 is a similar view with the opposite sides of the blanks in contact to show how alternate teeth are cut.

Referring to Fig. 3, the alternate cutting edges 11 are arcs which are one-half of an arc whose chord 18 is bisected by the line 19 or by one side of the blank.

Figure 1:
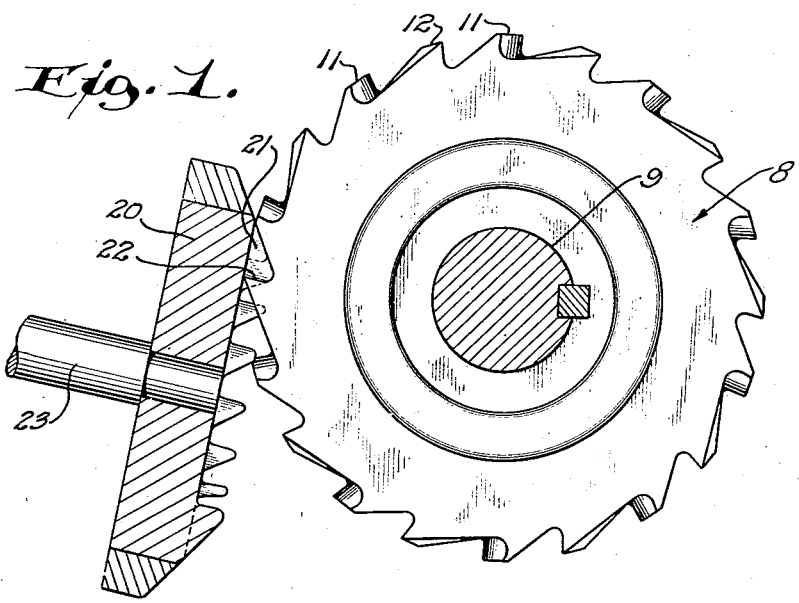

In manufacturing the improved cutters a circular cutting tool 20 is utilized having teeth 21 formed with cutting edges 22. This cutting tool is mounted on a rotating shaft 23, and the shaft is supported as shown in Fig. 1 with respect to the blank 8. To cut the cutting edges 11 the supporting shaft 23 for the cutting tool 20 is supported so that the center of rotation of the cutting tool 20 is toward one side of the blank, and when properly set every other tooth, or the teeth 11 are all cut in the blank by suitably indexing the blank after each tooth is cut. After the teeth 11 have been cut, then either the cutting tool or the blank is shifted so that the center of rotation of the cutting tool is adjacent the opposite side of the blank. The alternate teeth or the teeth having the cutting edges 10 are then all cut, the blank being suitably indexed after each tooth is completed.

To obtain more speedy production it is an important feature of the present invention to utilize the method of Figs. 2 and 3 wherein the teeth are cut in two blanks simultaneously. When this method is used two of the blanks 8 and 8' are placed with their sides together, as shown in Fig. 2, and the supporting shaft 23 of the cutter is so adjusted that the center of rotation of the tool 20 lies in the plane of the juxtaposed sides of the blanks 8 and 8', as indicated by the centers 14 of Fig. 2. When this setting is obtained the teeth having the cutting edge 10 on the blank 8 continues into the curve of the cutting edge 10 of the blank 8'. Thus equal arcs 10 are cut in both of the blanks simultaneously. After one tooth is cut to a desired depth the tool is withdrawn and the blanks are indexed simultaneously skipping one space to cut the next set of arcs 10. After all of the arcs 10 have been cut, then the blanks 8 and 8' are reversed in position, as shown in Fig. 3, so that their opposite sides are in contact and the sets of teeth having cutting edges 11 are cut into the blanks, using the centers 15 for the center of rotation of the cutting tool 20. These centers 15 of Fig. 3 are on opposite sides of both blanks from the centers 14 of Fig. 2, and the centers 15 are in the plane of the juxtaposed sides of the blanks of Fig. 3.

The side or radial cutting edges 12 may be formed in the usual manner.

It is apparent that with the above method of cutting teeth in the two blanks simultaneously, due to the fact that the teeth are cut on arcs, results in a great saving of time over the method of forming the old type of spiral mill having straight peripheral cutting edges. With the improved method, assuming that the teeth are ¼ inch deep, the rotary cutting tool 20 must be fed ¼ inch to cut one tooth in two blanks. To cut twenty-four teeth in two blanks the total feed movement is six inches. If it is desired to produce six milling cutters the operation must be repeated three times, with a total feed movement of the tool 20 of eighteen inches. This eighteen-inch feed movement compares with the one hundred ninety-two inches of feed movement required to make six spiral mill cutters of the old type having straight peripheral cutting edges.

When using the finished cutter it is of course rotated in a clockwise direction, referring to Fig. 1, which causes the curved cutting edges 10 and 11 to produce a shear cut which is more efficient than the shear type of cut produced by an angled straight edge. In addition there is very little strain on the corners of the curved teeth during use, and these teeth therefore resist breakage to a marked degree. Furthermore, the curved cutting edge is a longer edge for the same thickness blank than a straight cutting edge. The present invention therefore not only produces a more desirable type of milling cutter than heretofore manufactured but also produces the more desirable type with the expenditure of substantially less time and therefore at less cost.

The invention comprehends other modifications of the method and is therefore not intended to be limited to the precise methods above described, except as required by the appended claims.

What I claim is:

1. The method of cutting special teeth in the periphery of circular blanks to form milling cutters comprising, placing two identical blanks in registration with sides of the blanks in contact, supporting a rotating hollow mill type cutter adjacent the periphery of said blanks with the axis of rotation of the tool in the plane of the contacting sides of the blanks, feeding the rotating tool into the periphery of the blanks to cut teeth in the two blanks simultaneously, indexing the blanks after each tooth is cut and cutting every other tooth in the periphery of the blanks, shifting the blanks to bring the opposite sides in contact, and similarly cutting teeth in between each of the teeth already cut while the axis of rotation of the tool is in the plane of the new contacting sides of the blanks.

2. The method of cutting special teeth in the periphery of circular blanks to form milling cutters comprising, placing two blanks in registration with sides of the blanks adjacent each other, supporting a rotating hollow mill type cutter adjacent the periphery of said blanks with the axis of rotation of the tool intermediate the combined thicknesses of the two blanks, feeding the rotating tool into the periphery of the blanks to cut teeth in the two blanks simultaneously, indexing the blanks after each tooth is cut and cutting every other tooth in the periphery of the blanks, shifting the blanks to bring the opposite sides adjacent each other, and similarly cutting teeth in between each of the teeth already cut while the axis of rotation of the tool is intermediate the combined thicknesses of the two blanks.

EARNEST F. ABER.